US011998900B2

(12) United States Patent
Cruz et al.

(10) Patent No.: US 11,998,900 B2
(45) Date of Patent: Jun. 4, 2024

(54) IMMOBILIZING METAL CATALYSTS IN A POROUS SUPPORT VIA ADDITIVE MANUFACTURING AND CHEMICAL VAPOR TRANSFORMATION

(71) Applicants: Alexander John Cruz, Mechelen (BE); Navin Sakthivel, Spring, TX (US); Jayesh Jain, The Woodlands, TX (US); Michelangelo Bellacci, Florence (IT)

(72) Inventors: Alexander John Cruz, Mechelen (BE); Navin Sakthivel, Spring, TX (US); Jayesh Jain, The Woodlands, TX (US); Michelangelo Bellacci, Florence (IT)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 212 days.

(21) Appl. No.: 17/863,719

(22) Filed: Jul. 13, 2022

(65) Prior Publication Data
US 2024/0017248 A1   Jan. 18, 2024

(51) Int. Cl.
| | |
|---|---|
| *B01J 31/16* | (2006.01) |
| *B01J 35/00* | (2024.01) |
| *B01J 35/02* | (2006.01) |
| *B01J 35/10* | (2006.01) |
| *B01J 35/23* | (2024.01) |
| *B01J 35/50* | (2024.01) |
| *B01J 35/64* | (2024.01) |
| *B01J 35/66* | (2024.01) |
| *B01J 37/00* | (2006.01) |
| *B01J 37/02* | (2006.01) |
| *B01J 37/08* | (2006.01) |
| *B33Y 40/20* | (2020.01) |
| *B33Y 80/00* | (2015.01) |
| *B33Y 10/00* | (2015.01) |

(52) U.S. Cl.
CPC ....... *B01J 31/1625* (2013.01); *B01J 31/1691* (2013.01); *B01J 35/23* (2024.01); *B01J 35/50* (2024.01); *B01J 35/647* (2024.01); *B01J 35/651* (2024.01); *B01J 35/653* (2024.01); *B01J 35/657* (2024.01); *B01J 35/695* (2024.01); *B01J 37/0009* (2013.01); *B01J 37/0219* (2013.01); *B01J 37/0228* (2013.01); *B01J 37/08* (2013.01); *B33Y 40/20* (2020.01); *B33Y 80/00* (2014.12); *B33Y 10/00* (2014.12)

(58) Field of Classification Search
CPC .. B01J 31/1625; B01J 31/1691; B01J 35/647; B01J 35/23; B01J 35/695; B01J 35/653; B01J 35/651; B01J 35/50; B01J 35/657; B33Y 40/20; B33Y 80/00
See application file for complete search history.

(56) References Cited

U.S. PATENT DOCUMENTS 7,108,894 B2   9/2006   Renn
7,938,341 B2   5/2011   King et al.

OTHER PUBLICATIONS

Park et al., J. Chem. Commun., (2010), 46, 3086-3088.*
Park et al., J. Chem. Commun., (2010), 46, 3086-3088 (ESI).*

* cited by examiner

*Primary Examiner* — Yong L Chu
(74) *Attorney, Agent, or Firm* — CANTOR COLBURN LLP

(57) ABSTRACT

A method of immobilizing a metal catalyst in a porous support includes additively forming a precursor structure on a substrate from a metal catalyst and at least one of a metal oxide or a metal cluster compound; exposing the precursor structure to a vapor of an organic linker; and reacting the at least one of the metal oxide or the metal cluster compound in the precursor structure with the organic linker to form a porous support that immobilizes the metal catalyst.

24 Claims, 3 Drawing Sheets

IMMOBILIZING METAL CATALYSTS IN A POROUS SUPPORT VIA ADDITIVE MANUFACTURING AND CHEMICAL VAPOR TRANSFORMATION

BACKGROUND

In recent decades, increasing research efforts have been dedicated to developing methods for mitigating $CO_2$ emissions, due to the contribution of $CO_2$ to the greenhouse effect. Several $CO_2$ capture technologies have been introduced. As part of the carbon capture, utilization, and storage, transformation of the carbon is a route deemed economically viable. One approach is to convert $CO_2$ into fuels in the presence of catalysts rather than treating it as a waste material.

Development catalysts for $CO_2$ conversion are typically standalone powder. The catalysts can also be embedded or dispersed in solid supports. The supported catalysts are often synthetized via solvothermal preparation routes, where a mixture of precursors is heated in the presence of a solvent to form a precursor composition, resulting in powders. In certain stages, supports are mixed with the precursor composition to immobilize catalysts into the support, following the solvent filtration and drying. Using the methods, it can be challenging to control the structure, spatial distribution, and thickness of the catalyst layers. In addition, the supported catalysts made from these immobilization techniques can, on certain occasions, suffer from poor adhesion between the catalyst and the support. These drawbacks limit the catalyst activities and compromise the catalyst performance. Additionally, controlling catalyst structures will open new avenues in fine-tuning heat and mass transport properties of the material. Accordingly, there is a continuing need for an improved method for immobilizing catalysts in a porous support for converting $CO_2$ to fuels.

SUMMARY

A method of immobilizing a metal catalyst in a porous support includes additively forming a precursor structure on a substrate from a metal catalyst and at least one of a metal oxide or a metal cluster compound; exposing the precursor structure to a vapor of an organic linker; and reacting the at least one of the metal oxide or the metal cluster compound in the precursor structure with the organic linker to form a porous support that immobilizes the metal catalyst.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
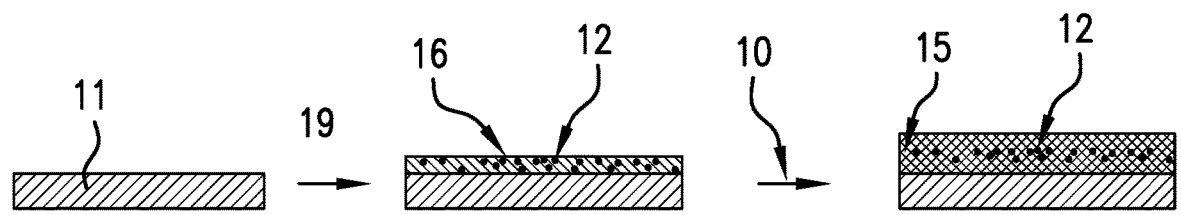
FIG. 1 is a side view illustrating a method of immobilizing a metal catalyst in a porous support on a representative structure or substrate, for $CO_2$ reduction to fuels according to an embodiment of the disclosure.

A detailed description of one or more embodiments of the disclosed method and system presented herein by way of exemplification and not limitation with reference to the Figures.

A method of immobilizing a metal catalyst for $CO_2$-to-fuels conversion in a porous support is described. The method comprises additively forming a precursor structure comprising the catalyst disposed in a matrix of at least one of a metal oxide or a metal cluster compound, followed by converting the matrix to a porous support via a chemical vapor transformation process, achieved by exposing the precursor structure to an organic linker vapor.

By using the method, the metal catalyst can be "trapped" or "enclosed" in the pores of the porous support. Thus the loss of the catalyst during use can be minimized, and frequent catalyst regeneration or treatment can be avoided, extending the catalyst's lifetime.

In addition, as the material and the structure of the porous support can be controlled, the heat and mass transport properties and the selectivity of the supported catalyst can be fine-tuned. For example, the molecules that may deactivate the catalyst can be prevented from reaching the catalyst by tuning the sizes of the pores that trapped the catalyst. The chemicals that can potentially interfere with $CO_2$-to-fuels conversion process can also be filtered off by the porous support. Accordingly, by tuning the pore sizes of the porous support, only certain molecules, such as $CO_2$ and $H_2$, can be allowed to reach the catalyst, thus improving the selectivity of the $CO_2$ conversion reaction. Additionally, in a conventional method that impregnates catalyst nanoparticles on a support, there is limited control over the distribution of the catalyst. Using the method as described herein, the catalyst can be disposed in a more controlled manner, and more surface area can be exposed, thus improving the mass transport of the $CO_2$-to-fuels process.

In addition, after the $CO_2$ conversion reaction occurs, some target products (fuels) can be stored in the pores of the porous support, and when the pores are saturated, the target products can be released using heat. In the event that catalyst regeneration is needed, using the supported catalyst as described herein can improve heat transport, as there is little material in contact with the support or the substrate.

Further, the metal catalyst can be distributed evenly with optimal quantities only in areas where the catalyst is desired, thereby saving costs.

Moreover, the method can be carried out in an integrated system that incorporates additive deposition and chemical vapor processing in a single chamber, resulting in increased throughput, i.e., lead-time savings. Further the supported catalysts made by the method can have finely-controlled dimension, composition, pore size, and catalyst distribution down to the nanometer and sub-nanometer scales. As these properties can be controlled, the supported catalysts can be used for $CO_2$ conversion to fuels applications with improved performance.

Referring to FIG. 1, a method of immobilizing a metal catalyst (12) in a porous support (15) comprises: additively forming (19) a precursor structure (16) from the metal catalyst (12) and at least one of a metal oxide or a metal cluster compound on a substrate (11); exposing the precursor structure (16) to a vapor of an organic linker (10); and reacting the at least one of the metal oxide or the metal cluster compound in the precursor structure (16) with the organic linker (10) to form a supported catalyst comprising the catalyst (12) immobilized in a porous support (15). The method can further include generating and delivering the vapor of the organic linker (10) to the precursor structure (16). Preferably the vapor of the organic linker (10) is generated in a separate system from where the vapor is contacted with the precursor structure so that the temperature to generate the vapor and the temperature to react the organic linker with the metal oxide or the metal cluster compound can be individually controlled.

The metal catalyst for $CO_2$-to-fuels conversion is a precious metal catalyst. Examples of the catalyst include gold, silver, ruthenium, rhodium, palladium, osmium, iridium, platinum, chromium, tungsten, or molybdenum. The metal catalyst can also include iron or cobalt. Precious metal catalysts are preferred. The catalyst can be used individually or in combination of two or more of the above-mentioned precious metals. Preferably, the metal catalyst comprises nanoparticles, and can have a particle size, or an average particle size of about 1 nanometers (nm) to about 20 nm, preferably about 1 nm to about 10 nm, more preferably about 1 nm to about 5 nm. The average particle size of the metal catalyst is, for example, a median diameter (D50) measured using a laser particle size distribution meter.

The metal oxide used to make the precursor structure can comprise at least one of zinc oxide, aluminum oxide, magnesium oxide, iron oxide, cobalt oxide, nickel oxide, copper oxide, calcium oxide, barium oxide, cerium oxide, manganese oxide, gallium oxide, cadmium oxide, titanium oxide, zirconium oxide, or magnesium aluminum oxide. Preferably the metal oxide comprises at least one of zinc oxide, aluminum oxide, magnesium oxide, iron oxide, cobalt oxide, nickel oxide, copper oxide, or calcium oxide. The metal cluster compound used to make the precursor structure can comprise at least one of a titanium-based cluster compound or a zirconium-based cluster compound. As used herein, a titanium-based cluster compound or a zirconium-based cluster compound refers to a cluster compound that contains titanium or zirconium as the main metal.

The metal oxide and the metal cluster compound can be in a particulate form. The particle sizes of the metal oxide and the metal cluster compound are not particularly limited. Advantageously, the metal oxide and the metal cluster compound can have a particle size or an average particle size of about 10 nanometers (nm) to about 100 micrometers (μm), preferably about 10 nm to about 10 μm, about 10 nm to about 1 μm, or about 10 nm to about 500 nm. The average particle size of the metal oxide and the metal cluster compound is, for example, a median diameter (D50) measured using a laser particle size distribution meter.

The metal in the metal oxide or the metal cluster is preferably different from the precious metal catalyst (e.g., platinum, palladium). Using the metal catalyst and the metal oxide/metal cluster compound as described herein does not interfere with the additive manufacturing process and the chemical vapor transformation chemistry.

The substrate that the precursor structure disposed on is not particularly limited, and can include metallic substrates, ceramic substrates, polymeric substrates, or composite substrates. In an embodiment, the substrate is an electrode or an internal packing material including carbon such as graphene and carbon nanotubes, alumina, silica, metals, or a combination including at least one or at least two of the foregoing.

As used herein, "additively forming the precursor structure" means that the precursor structure is formed via additive manufacturing modalities. By using additive manufacturing, the precursor structure can be engineered based on the optimized catalyst activity in consideration of the targeted $CO_2$-to-fuels conversion. In particular, additive manufacturing processes such as aerosol jetting, binder jetting, or material jetting can be employed to print the mixture of (1) the metal catalyst, (2) the precursor of the porous support (e.g. metal oxide and/or metal cluster), and (3) optionally other additives such as binders, solvents, or a combination thereof, by selectively depositing the mixture in areas where the chemical performance can be optimized. The additive manufacturing allows for the use of generative design structures, which can impart a high surface-area-to-volume ratio to the supported catalyst, thus facilitating an increase in the $CO_2$-to-fuels conversion rate.

The properties of the parts built with additive manufacturing depend on additive manufacturing parameters such as feedstock characteristics, design and build set up, printing process parameters, and post-processing. These parameters can be optimized to produce defect-free parts. The physical characteristics of pores in the printed parts such as size, amount, morphology, and distribution can be controlled based on the additive manufacturing parameters. Small sized pores exist even in the so-called "defect-free" parts that have density greater than a threshold of, for example, 99.50%.

Accordingly, before the additive manufacturing process begins, the $CO_2$ conversion system can be analyzed, and the catalyst and porous support (e.g., metal-organic frameworks) chemistries can be selected based on the desired output, reactor configuration, and conversion process parameters. The characterization of the porous structure, process variability (e.g., $CO_2$ concentration in the feed stream) and additive manufacturing parameters can then be determined.

Additively forming the precursor structure can be conducted via additive manufacturing modalities such as an aerosol jetting process, a binder jetting process, or a material jetting process.

When an aerosol jetting process is used to make the precursor structure, a composition comprising the metal catalyst, and at least one of the metal oxide or the metal cluster compound and optionally a solvent is loaded in an aerosol jetting apparatus, and then the metal catalyst/metal oxide/metal cluster compound is atomized using either ultrasonic or pneumatic processes. The atomized metal catalyst and metal oxide/metal cluster compound in the composition can then be picked up by an inert carrier gas to form an aerosol. The aerosol can be conducted to a nozzle, where the aerosol is focused and collimated as it exits the nozzle. The focused aerosol stream is directed toward a substrate such that the atomized metal catalyst and metal oxide/metal cluster compound is deposited on the substrate. The deposited metal catalyst and metal oxide/metal cluster compound can be annealed or sintered at a temperature that is less than the melting point of the metal catalyst, for example at about 250 to about 2000° C., or about 450° C. to about 2000° C. and a pressure of about 1 millibar to about 1 bar to form the precursor structure.

An exemplary aerosol jetting apparatus which could be used is manufactured by Optomec, Inc, and is described, for example, in U.S. Pat. Nos. 7,108,894 and 7,938,341. Commercially available aerosol jetting apparatus includes Optomec AEROSOL JET 300 series systems.

The precursor structure can also be additively formed via a binder jetting process. Before binder jetting starts, parameter such as powder characteristics (e.g., morphology, powder size distribution, and chemical composition), printing process parameters (e.g., layer thickness, print orientation, binder saturation, print speed, and drying time), sintering (e.g., temperature and holding time) and post-processing can be determined as described herein.

During a binder jetting process, a layer of a powder comprising a metal catalyst and at least one of a metal oxide or a metal cluster compound is deposited on a substrate. Then a liquid binder is selectively sprayed to the powder layer according to a preset pattern. The liquid binder can comprise an organic binder and optional a solvent for the organic binder. After applied to the powder, the binder is solidified or dried. Additional powder and additional binder are deposited to form the next layer. The process is repeated until a green structure is formed. Thereafter the green structure is sintered to form the precursor structure. The sintering temperature is below the melting point of the metal catalyst at the process pressure, for example at least about 5° C. lower, at least 10° C. lower, or at least about 20° C. lower than the melting point of the metal catalyst at the process pressure, and can be from about 150 to about 2000° C., preferably from about 450 to about 2000° C. The sintering can be conducted at a pressure of about 1 millibar to about 1 bar. During sintering, the binder can be burned off.

The precursor structure can also be formed via a material jetting process. Material jetting can be referred to as continuous or drop-on-demand jetting. The metal catalyst and metal oxide/metal cluster compound jetted on the substrate can be sintered or annealed forming the precursor structure.

The precursor structure comprises the metal catalyst disposed in a matrix formed from at least one of the metal oxide or the metal cluster compound. The matrix has pores having a size of about 200 nm to about 1 mm or larger, about 200 nm to about 1 mm, or about 1 μm to about 500 μm. There are several methods to adjust the pore size of the matrix. In an embodiment, porosity is be engineered by choosing the additive manufacturing process that has the resolution equal to the desired size of porosity. For example 1 micron resolution process can yield an engineered porosity of 1 micron or greater. Another way to adjust the porosity of the matrix is to dispense a porous particle as dispersed phase through one deposition head and dispense the matrix phase material through another deposition head. Examples of the porous particle include a particle with porosity due to gas entrapment or inter-dendritic cooling. When the desired size of the porosity is smaller than the resolution of the additive manufacturing process, a stochastic method can be used wherein the small, uncontrolled pores are statistically characterized for its variability within the process and dependency on the additive manufacturing (AM) parameters, and the AM parameters are stochastically or parametrically optimized to achieve the desired pore size, morphology, and distribution. As used herein, the matrix phase material refers to the combination of the metal catalyst with at least one of the metal oxide or the metal cluster compound. Alternatively, depositing material following by depositing a chemical that can result in an exothermic reaction releasing heat thereby introducing porosity.

The precursor structure made by the method described herein can have a thickness of about 10 nm to about 10 microns, about 100 nm to about 1 micron, or about 800 nm to about 10 microns. As used herein, the thickness of the precursor structure can be measured at a direction perpendicular to the substrate. After the precursor structure is formed but before the precursor structure is exposed to an organic linker vapor, the precursor structure can optionally be depowdered to remove loose particles from a surface of the precursor structure.

Next, the precursor structure is subjected to chemical vapor transformation by dosing an organic linker, thereby forming a porous support having pores, and locking the metal catalyst inside the pores of the porous support. The organic linker can comprise at least one of a carboxylate or an imidazolate. Examples of the organic linker include 2-methylimidazolate, 2-ethylimidazolate, 1-benzyl-1H-imidazolate, benzene-1,4-dicarboxylate, trans-1,4-cyclohexanedicarboxylate, 1,3,5-benzenetricarboxylate, and benzene-1,2,4,5-tetracarboxylate. Other known organic linkers can also be used. More than one organic linker can be used. In an aspect, a vapor of two or more organic linkers are reacted with the at least one of the metal oxide or the metal cluster compound in the precursor structure to form the porous support.

The metal oxide or the metal cluster compound can react with the organic linker at a temperature of about 80° C. to about 185° C., preferably about 80° C. to about 100° C. and a pressure of about 0.001 bar to about 10 bar, preferably about 0.001 bar to about 1 bar to form the porous support.

After the reaction, the porous support can be activated by heating the porous support at a temperature of about 100 to about 200° C., preferably about 120° C. to about 150° C. at a subatmospheric pressure of about 0.0001 bar to about 0.01 bar, preferably about 0.0001 bar to about 0.001 bar. During activation, the excess organic linker that is deposited on the porous support, and inside the pores of the porous support but not reacted with the metal oxide or metal cluster compound may be removed. The only material left inside pores of the porous support is the metal catalyst.

The formed supported catalyst can have a thickness of about 10 nm to about 500 nm, or about 1 μm to about 100 μm. The thickness of the supported catalyst can be measured in a direction perpendicular to the substrate. The porous support comprises a metal-organic framework. In particular, the porous support can have a crystalline network of solids comprising inorganic nodes linked by organic moieties, wherein the inorganic nodes are formed from at least one of the metal oxide or the metal cluster compound, and the organic moieties are formed from the organic linker. The pore diameter of the voids in the crystalline network can be in a range of about 5 to about 20 angstroms (Å), and the pore walls area is approximately a single-molecule thick. This crystalline lattice provides large internal specific surface areas (up to >~7000 $m^2/g$). In an embodiment, the size of the metal catalyst is smaller than the size of the pores of the metal organic framework, and at least a portion of the metal catalyst is disposed in the pores with a size of 5 to about 20 angstroms.

The size of the metal catalyst can be selected such that the metal catalyst can be disposed in the pores of the porous support, and meanwhile there is still sufficient space for the $CO_2$ and the products (fuels).

In an embodiment, the porous support has multi-modal pore size distribution comprising: (i) first pore size range from about 5 to about 20 angstroms, attributed to the intrinsic microporosity of the material such as interstitial spaces and molecular defects, which enable dispersion of metal catalyst nanoparticles, (ii) second pore size range from about 1 nm to about 200 nm, about 5 nm to about 200 nm, or about 10 nm to about 180 nm, formed using the chemical vapor transformation process, which facilitate entrapment of catalyst, achieved using additive manufacturing via a range process, e.g., patterning, and (iii) third pore size range from about 200 nm to about 1 mm or about 250 nm to about 1 mm, formed using the additive manufacturing process, which enable enhanced diffusion during the chemical vapor transformation and enhanced surface contact during $CO_2$ conversion.

With the method disclosed herein, the localization, the shape, the thickness, pore size, pore distribution, catalyst distribution and the composition of the porous support can be tuned, and these features cannot be achieved with the conventional solvent-based or bulk preparation methods.

Figure 2:
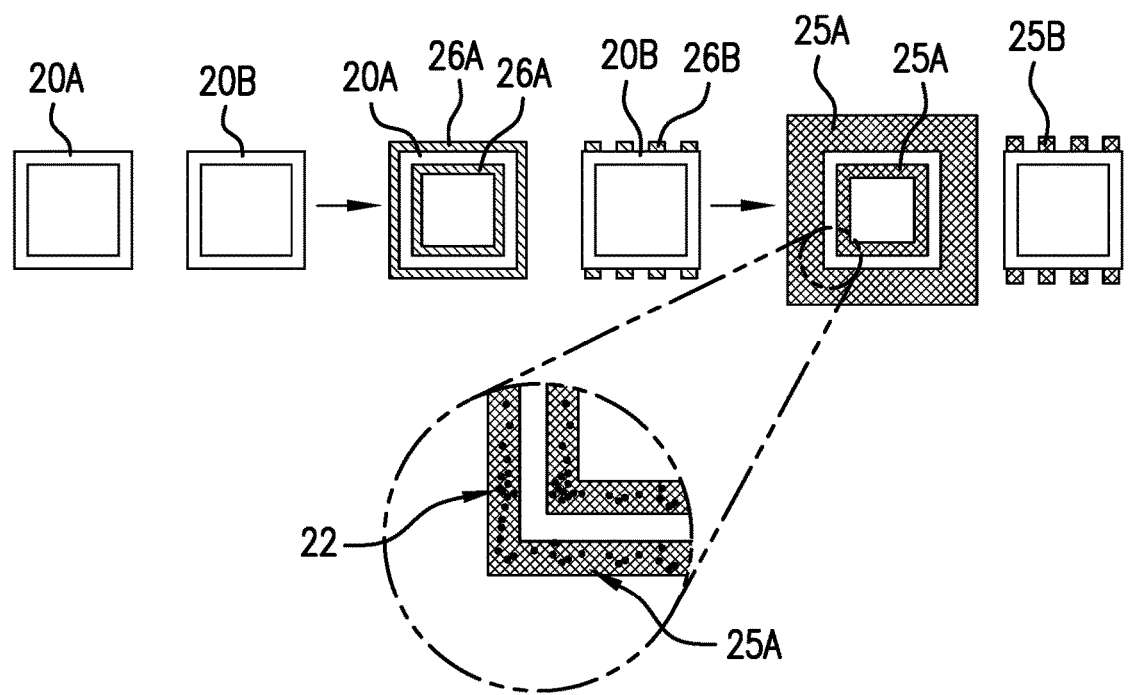
FIG. 2 is a top view illustrating methods of immobilizing a metal catalyst in a porous support having different patterns on a representative structure or substrate.

The method as disclosed herein can not only produce a continuous structure but also a discontinuous porous structure or a porous structure having a predetermined pattern. The supported catalyst can also be formed on different surfaces of the same substrate. FIG. 2 illustrates a process of forming a precursor structure (26A, 26B) on a substrate (20A, 20B), and then converting the precursor structure to the supported catalyst (25A, 25B) disposed on the substrate, where the supported catalyst comprises catalyst 22 immobilized in a porous support. As illustrated in FIG. 2, supported catalyst 25A is disposed on both surfaces of the substrate (20A), and the supported catalyst 25B has a pattern and is also disposed on different surfaces of the substrate.

Figure 3A:
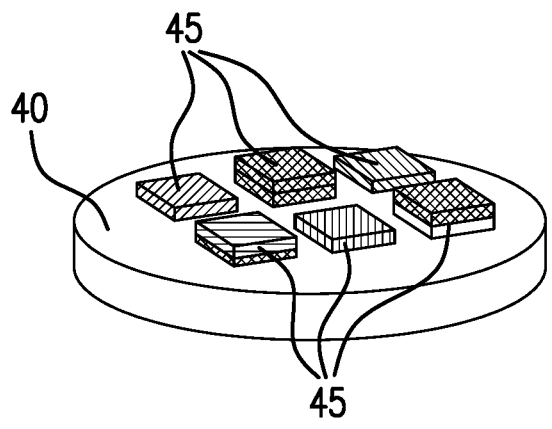
FIGS. 3A-3C illustrates systems comprising supported catalysts disposed on a representative substrate or structure, wherein the supported catalysts have at least one of a different shape, a different thickness, a different pattern, or a different material.
Figure 3B:
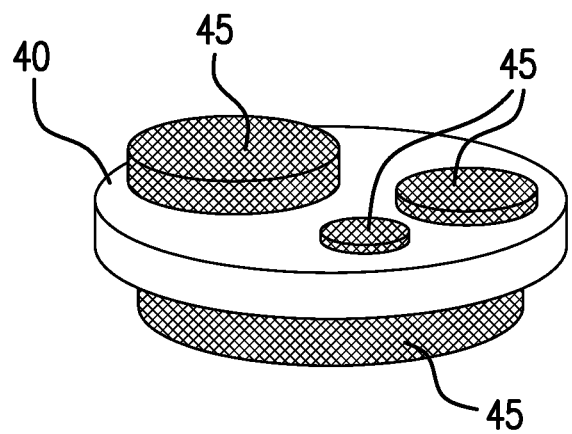
Figure 3C:
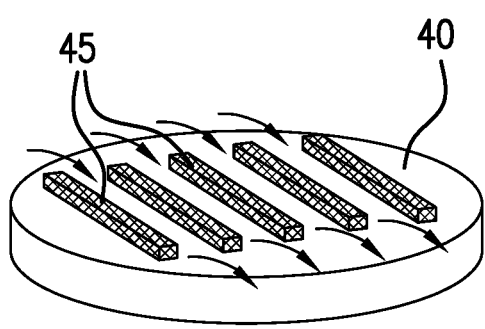

FIGS. 3A-3C illustrate supported catalyst (45) having different size, shape, thickness, pattern, or composition disposed on a substrate (40). The pattern can be designed to achieve a "functional effect" for various applications. Such supported catalyst/substrate system can be manufactured by the method described herein but not with the conventional methods.

Figure 4A:
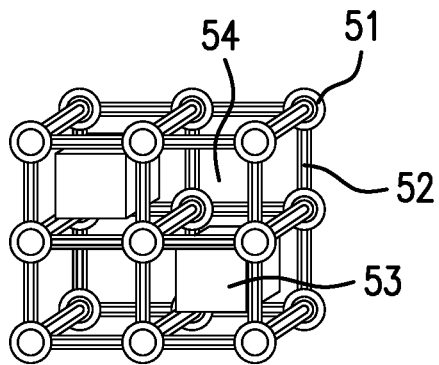
FIG. 4A and FIG. 4B illustrate representative microstructures of a metal catalyst immobilized in a porous support.
Figure 4B:
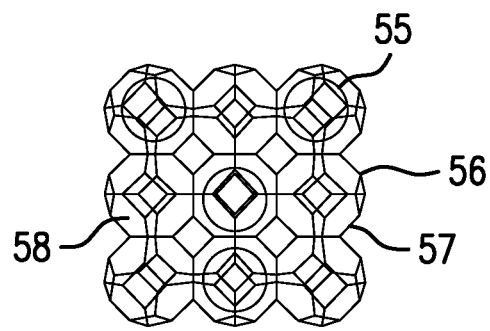

FIGS. 4A and 4B illustrate representative microstructures of a metal catalyst immobilized in a porous support. As shown in these figures, the method as described herein produces a porous support, which is a metal-organic framework comprising inorganic nodes (51, 56) linked by organic moieties (52, 57), and a metal catalyst (53, 55) immobilized in the pores (54, 58) of the metal-organic framework.

Advantageously, in the system for manufacturing the supported catalyst, a chemical vapor transformation system is integrated into an additive manufacturing system. Thus the precursor structure and the supported catalyst can be formed in a single reactor chamber.

As a specific example, a method of immobilizing a metal catalyst in a porous support comprises additively forming a precursor structure on a substrate via an aerosol jetting process, a binder jetting process, or a material jetting process from a metal catalyst and at least one of a metal oxide or a metal cluster compound in a reactor chamber equipped with a heater, the metal catalyst comprising nanoparticles of a precious metal; introducing a vapor of the organic linker and optionally together with a carrier gas into the reactor chamber; exposing the precursor structure to the vapor of the organic linker in the reactor chamber; reacting the at least one of the metal oxide or the metal cluster compound in the precursor structure with the organic linker in the reactor chamber at a temperature of about 80° C. to about 100° C. to form the porous support; and exposing the porous support to a temperature of about 120° C. to about 150° C. at a subatmospheric pressure of about 0.0001 bar to about 0.001 bar to activate the supported catalyst forming a supported catalyst, the supported catalyst comprising a metal-organic framework having pores with a pore size of from about 5 to about 20 angstroms and at least a portion of the metal catalyst disposed in the pores.

Figure 5:
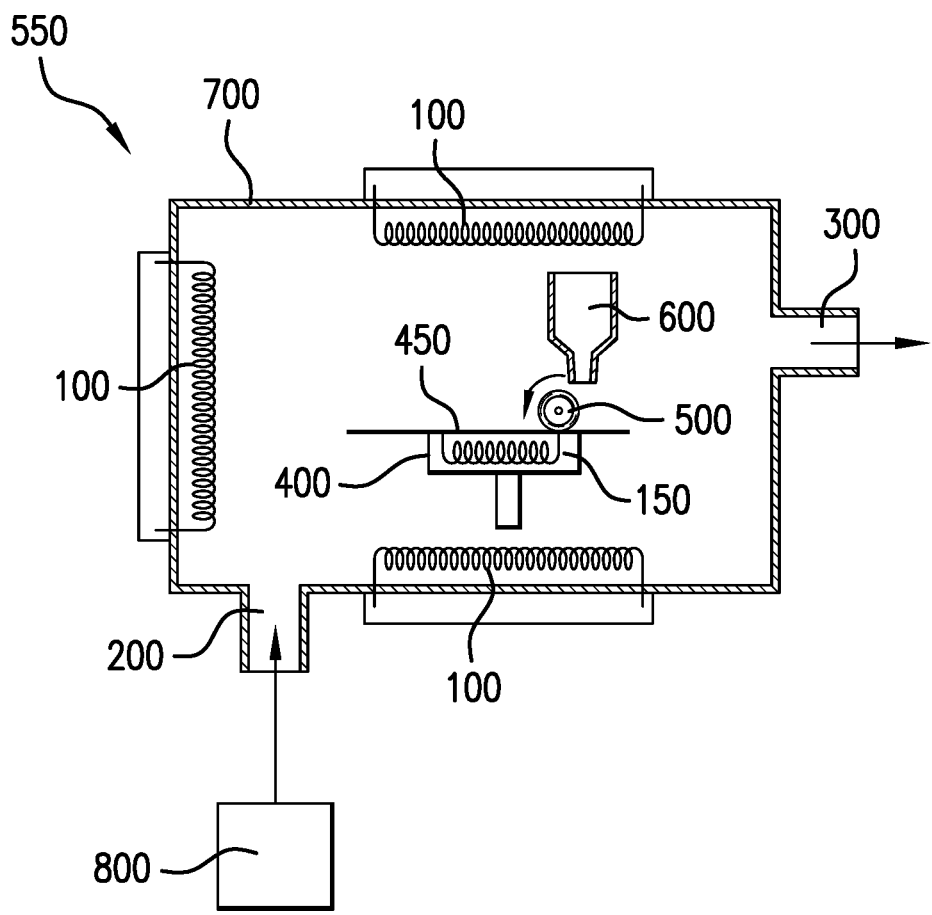
FIG. 5 illustrates an integrated system for immobilizing a metal catalyst in a porous support according to an embodiment of the disclosure.

The method can be carried out in an integrated system as shown in FIG. 5. The system (550) comprises a reactor chamber (700) equipped with a heater (100) effective to heat the reactor chamber (700). The heater (100) can also heat the substrate disposed in the reactor chamber (700). The integrated system can have more than one heaters to ensure that the interior of the reactor chamber is evenly heated. The heaters can be individually controlled. Accordingly each chamber wall can have a different temperature if desired. The configuration allows for further control over the additive formation process and chemical transformation kinetics.

The reactor chamber (700) can have an inlet (200) for introducing a vapor of an organic linker and optionally a carrier gas into the reactor chamber (700) and an outlet (300) for removing a gaseous stream from the reactor chamber (700). The vapor of the organic linker can be generated in a vapor generation system, for example, chamber 800, which is in fluid communication with the reactor chamber (700). The vapor generation system can have a heater (not shown). The temperature of the vapor generation system may be different from the temperature of the reactor chamber. The gaseous stream to be removed can include byproducts and the gaseous carrier if used. The outlet (300) of the reactor chamber (700) can be coupled to a pump.

The integrated system (550) also includes a platform (400) disposed inside the reactor chamber (700). The platform (400) can be movable and is effective to support a substrate (450) where the metal catalyst and the metal oxide/metal cluster compound is disposed on. Optionally, the movable platform (400) is also equipped with a heater (150). The platform can have more than one heaters to ensure that the substrate is evenly heated. The heater (150) allows the substrate to be heated to a temperature that is different from the chamber temperature. The additional heater (150) can permit further control over the additive formation process and chemical transformation kinetics.

The integrated system (550) can also include an additive manufacturing apparatus (600) disposed inside the reactor chamber (700). The additive manufacturing apparatus (600) is effective to additively forming a precursor structure on the substrate. Known additive manufacturing apparatus can be used and can include an aerosol jetting apparatus, a binder jetting apparatus, or a material jetting apparatus. Optionally the integrated system (550) also includes a roller (500) to spread the powder jetted onto the substrate to be coated.

Set forth below are some embodiments of the foregoing disclosure:

Aspect 1. A method of immobilizing a metal catalyst in a porous support, the method comprising: additively forming a precursor structure on a substrate from a metal catalyst and at least one of a metal oxide or a metal cluster compound; exposing the precursor structure to a vapor of an organic linker; and reacting the at least one of the metal oxide or the metal cluster compound in the precursor structure with the organic linker to form a porous support that immobilizes the metal catalyst.

Aspect 2. The method as in any prior aspect, comprising additively forming the precursor structure via an aerosol jetting process, a binder jetting process, or a material jetting process.

Aspect 3. The method as in any prior aspect, wherein the metal catalyst comprises nanoparticles of a precious metal catalyst.

Aspect 4. The method as in any prior aspect, wherein the metal catalyst comprises at least one of gold, silver, ruthenium, rhodium, palladium, osmium, iridium, platinum, chromium, tungsten, molybdenum, iron, or cobalt.

Aspect 5. The method as in any prior aspect, wherein the metal catalyst has an average particle size of about 1 nm to about 20 nm.

Aspect 6. The method as in any prior aspect, wherein the metal catalyst is present in an amount of about 1 to about 5% based on a total weight of the porous support.

Aspect 7. The method as in any prior aspect, wherein the precursor structure is formed from the metal catalyst and the metal oxide, and the metal oxide comprises at least one of zinc oxide, aluminum oxide, magnesium oxide, iron oxide, cobalt oxide, nickel oxide, copper oxide, calcium oxide, barium oxide, cerium oxide, manganese oxide, gallium oxide, cadmium oxide, titanium oxide, zirconium oxide, or magnesium aluminum oxide.

Aspect 8. The method as in any prior aspect, wherein the precursor structure is formed from the metal catalyst and the metal cluster compound, and the metal cluster compound comprises at least one of a titanium-based cluster compound or a zirconium-based cluster compound.

Aspect 9. The method as in any prior aspect, wherein the metal oxide and the metal cluster compound have an average particle size of about 10 nm to about 100 μm.

Aspect 10. The method as in any prior aspect, wherein the precursor structure comprises the metal catalyst disposed in a matrix formed from at least one of the metal oxide or the metal cluster compound, and the matrix has pores with a pore size of about 200 nm to about 1 mm.

Aspect 11. The method as in any prior aspect, further comprising controlling the pore size of the matrix by choosing an additive manufacturing process with a resolution that is equal to or greater than a target porosity.

Aspect 12. The method as in any prior aspect, further comprising controlling the pore size of the matrix by dispensing a porous particle as a dispersed phase through one deposition head and dispensing the metal catalyst and at least one of the metal oxide or the metal cluster compound through another deposition head.

Aspect 13. The method as in any prior aspect, further comprising statistically characterizing pores' variability within an additive manufacturing process and dependency on additive manufacturing parameters, and stochastically or parametrically optimizing the additive manufacturing parameters to provide a selected pore size, morphology, distribution, or a combination thereof of the precursor structure.

Aspect 14. The method as in any prior aspect, wherein the organic linker comprises at least one of a carboxylate or an imidazolate.

Aspect 15. The method as in any prior aspect, wherein the substrate is an electrode or an internal packing material.

Aspect 16. The method as in any prior aspect, comprising reacting the at least one of the metal oxide or the metal cluster compound in the precursor structure with the organic linker at a temperature of about 80° C. to about 100° C. to form the porous support.

Aspect 17. The method as in any prior aspect, comprising reacting the at least one of the metal oxide or the metal cluster compound in the precursor structure with the organic linker at a pressure of about 0.001 bar to about 1 bar to form the porous support.

Aspect 18. The method as in any prior aspect, wherein the additively forming, the exposing, and the reacting occur in a single reactor chamber.

Aspect 19. The method as in any prior aspect, further comprising exposing the porous support to a temperature of about 120° C. to about 150° C. at a subatmospheric pressure of about 0.0001 bar to about 0.001 bar to activate the porous support.

Aspect 20. The method as in any prior aspect, wherein the porous support is a metal-organic framework, and the metal-organic framework is a crystalline network comprising inorganic nodes linked by organic moieties, the inorganic nodes formed from the at least one of the metal oxide or the metal cluster compound, and the organic moieties formed from the organic linker.

Aspect 21. The method as in any prior aspect, the porous support comprising pores having a pore size of about 5 to about 20 angstroms wherein at least a portion of the metal catalyst is disposed in the pores.

Aspect 22. The method as in any prior aspect, wherein the porous support has a multimodal pore size distribution comprising first pore sizes from about 5 to about 20 angstroms, attributed to intrinsic porosity of the porous support, second pore sizes from about 1 nm to about 200 nm, and third pore sizes from about 200 nm to about 1 mm.

Aspect 23. The method as in any prior aspect, wherein the porous support is discontinuous and has a predetermined pattern.

Aspect 24. The method of aspect 1, wherein the porous support has a first portion and a second portion, and the first portion and the second portion have at least one of a different thickness; a different shape; a different metal catalyst; or a porous support.

Aspect 25. The method as in any prior aspect, comprising: additively forming the precursor structure on the substrate via an aerosol jetting process, a binder jetting process, or a material jetting process from the metal catalyst and at least one of the metal oxide or the metal cluster compound in a reactor chamber equipped with a heater, the metal catalyst comprising nanoparticles of a precious metal; introducing the vapor of the organic linker into the reactor chamber; exposing the precursor structure to the vapor of the organic linker in the reactor chamber; reacting the at least one of the metal oxide or the metal cluster compound in the precursor structure with the organic linker in the reactor chamber at a temperature of about 80° C. to about 100° C. to form the porous support; and exposing the porous support to a temperature of about 120° C. to about 150° C. at a subatmospheric pressure of about 0.0001 bar to about 0.001 bar to activate the porous support forming a supported catalyst, the supported catalyst comprising a metal-organic framework having pores with a pore size of from about 5 to about 20 angstroms and at least a portion of the metal catalyst disposed in the pores.

All ranges disclosed herein are inclusive of the endpoints, and the endpoints are independently combinable with each other. As used herein, "combination" is inclusive of blends, mixtures, alloys, reaction products, and the like. All references are incorporated herein by reference in their entirety.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A method of immobilizing a metal catalyst in a porous support, the method comprising:

additively forming a precursor structure on a substrate from a metal catalyst and at least one of metal oxides or metal cluster compounds;

exposing the precursor structure to a vapor of an organic linker; and reacting the at least one of the metal oxide or the metal cluster compound in the precursor structure with the organic linker to form a porous support that immobilizes the metal catalyst.

2. The method of claim 1, comprising additively forming the precursor structure via an aerosol jetting process, a binder jetting process, or a material jetting process.

3. The method of claim 1, wherein the metal catalyst comprises nanoparticles of a precious metal catalyst.

4. The method of claim 1, wherein the metal catalyst comprises at least one of gold, silver, ruthenium, rhodium, palladium, osmium, iridium, platinum, chromium, tungsten, molybdenum, iron, or cobalt.

5. The method of claim 1, wherein the metal catalyst has an average particle size of about 1 nm to about 20 nm.

6. The method of claim 1, wherein the metal catalyst is present in an amount of about 1 to about 5% based on a total weight of the porous support.

7. The method of claim 1, wherein the precursor structure is formed from the metal catalyst and the metal oxide, and the metal oxide comprises at least one of zinc oxide, aluminum oxide, magnesium oxide, iron oxide, cobalt oxide, nickel oxide, copper oxide, calcium oxide, barium oxide, cerium oxide, manganese oxide, gallium oxide, cadmium oxide, titanium oxide, zirconium oxide, or magnesium aluminum oxide.

8. The method of claim 1, wherein the precursor structure is formed from the metal catalyst and the metal cluster compound, and the metal cluster compound comprises at least one of a titanium-based cluster compound or a zirconium-based cluster compound.

9. The method of claim 1, wherein the metal oxide and the metal cluster compound have an average particle size of about 10 nm to about 100 μm.

10. The method of claim 1, wherein the precursor structure comprises the metal catalyst disposed in a matrix formed from at least one of the metal oxide or the metal cluster compound, and the matrix has pores with a pore size of about 200 nm to about 1 mm.

11. The method of claim 1, further comprising controlling the pore size of the matrix by dispensing a porous particle as a dispersed phase through one deposition head and dispensing the metal catalyst and at least one of the metal oxide or the metal cluster compound through another deposition head.

12. The method of claim 1, further comprising statistically characterizing pores' variability within an additive manufacturing process and dependency on additive manufacturing parameters, and stochastically or parametrically optimizing the additive manufacturing parameters to provide a selected pore size, morphology, distribution, or a combination thereof of the precursor structure.

13. The method of claim 1, wherein the organic linker comprises at least one of a carboxylate or an imidazolate.

14. The method of claim 1, wherein the substrate is an electrode or an internal packing material.

15. The method of claim 1, comprising reacting the at least one of the metal oxide or the metal cluster compound in the precursor structure with the organic linker at a temperature of about 80° C. to about 100° C. to form the porous support.

16. The method of claim 1, comprising reacting the at least one of the metal oxide or the metal cluster compound in the precursor structure with the organic linker at a pressure of about 0.001 bar to about 1 bar to form the porous support.

17. The method of claim 1, wherein the additively forming, the exposing, and the reacting occur in a single reactor chamber.

18. The method of claim 1, further comprising exposing the porous support to a temperature of about 120° C. to about 150° C. at a subatmospheric pressure of about 0.0001 bar to about 0.001 bar to activate the porous support.

19. The method of claim 1, wherein
the porous support is a metal-organic framework, and
the metal-organic framework is a crystalline network comprising inorganic nodes linked by organic moieties, the inorganic nodes formed from the at least one of the metal oxide or the metal cluster compound, and the organic moieties formed from the organic linker.

20. The method of claim 19, wherein the porous support comprises pores having a pore size of about 5 to about 20 angstroms; and at least a portion of the metal catalyst is disposed in the pores.

21. The method of claim 1, wherein the porous support has a multimodal pore size distribution comprising first pore sizes from about 5 to about 20 angstroms, attributed to intrinsic porosity of the porous support, second pore sizes from about 1 nm to about 200 nm, and third pore sizes from about 200 nm to about 1 mm.

22. The method of claim 1, wherein the porous support is discontinuous and has a predetermined pattern.

23. The method of claim 1, wherein the porous support has a first portion and a second portion, and the first portion and the second portion have at least one of a different thickness; a different shape; a different metal catalyst; or a porous support.

24. The method of claim 1, comprising:
additively forming the precursor structure on the substrate via an aerosol jetting process, a binder jetting process, or a material jetting process from the metal catalyst and at least one of the metal oxides or the metal cluster compounds in a reactor chamber equipped with a heater, the metal catalyst comprising nanoparticles of a precious metal;
introducing the vapor of the organic linker into the reactor chamber;
exposing the precursor structure to the vapor of the organic linker in the reactor chamber;
reacting the at least one of the metal oxide or the metal cluster compound in the precursor structure with the organic linker in the reactor chamber at a temperature of about 80° C. to about 100° C. to form the porous support; and
exposing the porous support to a temperature of about 120° C. to about 150° C. at a subatmospheric pressure of about 0.0001 bar to about 0.001 bar to activate the porous support forming a supported catalyst, the supported catalyst comprising a metal-organic framework having pores with a pore size of from about 5 to about 20 angstroms and at least a portion of the metal catalyst disposed in the pores.

* * * * *